United States Patent [19]

Carlsson

[11] Patent Number: 5,007,602
[45] Date of Patent: Apr. 16, 1991

[54] CLICK MECHANISM IN A FISHING REEL

[75] Inventor: Karl L. Carlsson, Asarum, Sweden

[73] Assignee: Abu Garcia Produktion AB, Svangsta, Sweden

[21] Appl. No.: 494,340

[22] Filed: Mar. 16, 1990

[51] Int. Cl.$^5$ .................................... A01K 89/027
[52] U.S. Cl. .................... 242/246; 116/67 R; 242/223; 242/306; 446/420
[58] Field of Search ............... 242/245, 246, 306; 116/67 A, 67 R; 446/404, 417, 420

[56] References Cited

U.S. PATENT DOCUMENTS

| 2,758,801 | 8/1956 | Bonanno | 242/246 |
| 4,173,317 | 11/1979 | Hamayasu et al. | 242/246 X |
| 4,200,248 | 4/1980 | Puryear | 242/245 |
| 4,488,689 | 12/1984 | Councilman | 242/245 |
| 4,496,115 | 1/1985 | Kreft et al. | 242/306 |
| 4,522,347 | 6/1985 | Swisher | 242/244 |

Primary Examiner—Daniel P. Stodola
Assistant Examiner—Charles Riggs, Jr.
Attorney, Agent, or Firm—Browdy and Neimark

[57] ABSTRACT

A click mechanism in a fishing reel is adapted to produce a click sound on relative rotation between a shaft having a first member non-rotatably connected thereto, and a second member which is rotatably mounted on the shaft. The click mechanism comprises a snap-action click ring which is provided between the first member and the second member. First teeth are formed on the side of the first member facing the snap-action click ring. Second teeth are formed on the side of the second member facing the snap-action click ring. The snap-action click ring comprises a first resilient tongue and a second resilient tongue which extend in the same direction in the circumferential direction of the snap-action click ring but are outwardly bent in opposite directions in the axial direction thereof. The first resilient tongue engages the first teeth, and the second resilient tongue engages the second teeth.

3 Claims, 2 Drawing Sheets

FIG._1
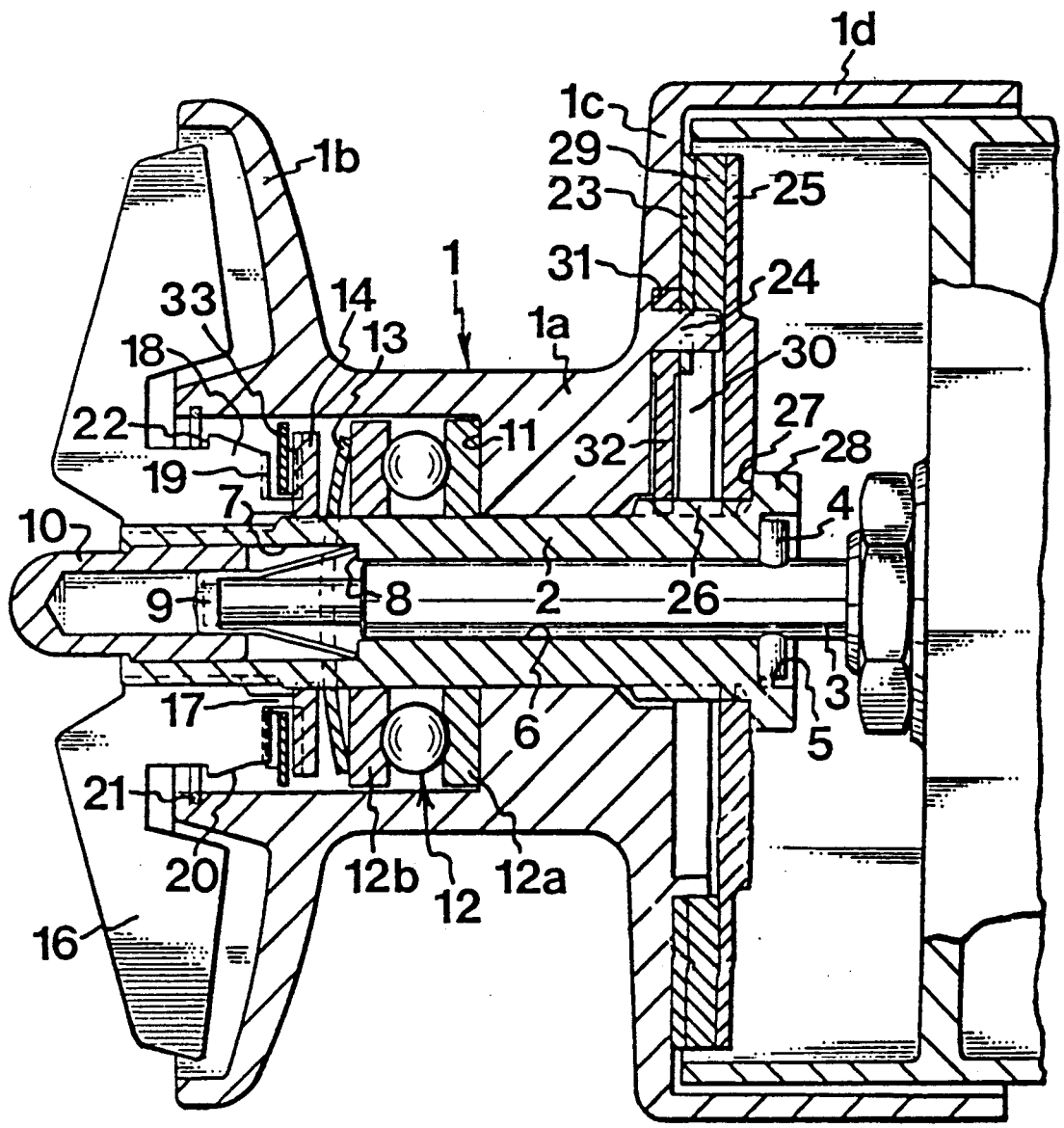

FIG_2
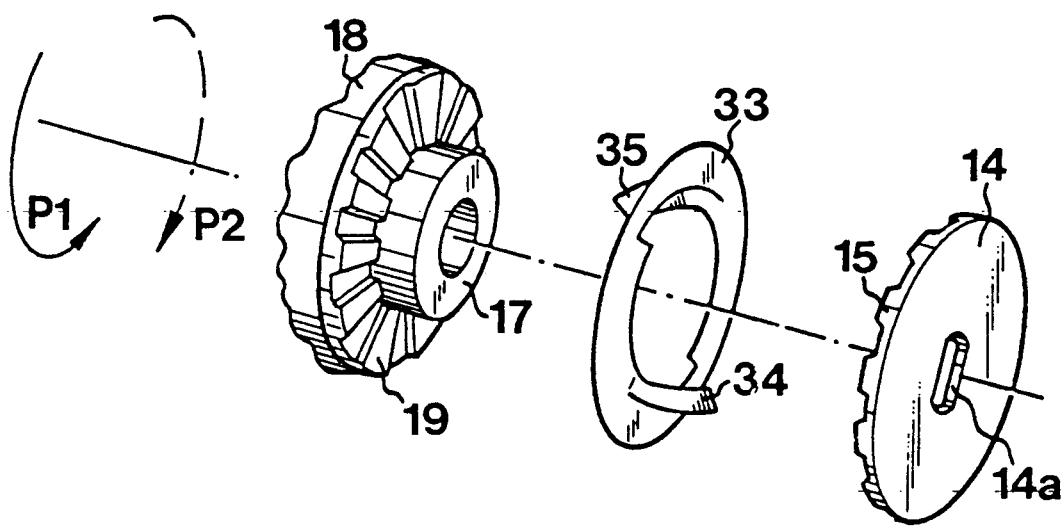

CLICK MECHANISM IN A FISHING REEL

BACKGROUND OF THE INVENTION

The present invention relates to a click mechanism in a fishing reel.

A known fishing reel of the fixed-spool type has a shaft on the front end of which a line spool is rotatably mounted. The line spool has a cylindrical central portion on which a line is to be wound. The line spool has a front end flange and a rear end flange which are arranged on both sides of the central portion and extend radially outwards therefrom. A line spool brake mechanism for braking the rotation of the line spool on the shaft comprises friction washers which are pressed against each other by an adjustable force. The friction washers are pressed against each other by an adjusting knob which is rotatably mounted on the shaft. A washer which is non-rotatably mounted on the shaft has, on its side facing the adjusting knob, a projecting pin in the form of a rivet which carries a click spring. The click spring consists of a helical metal strip whose radially outer end is attached to the washer by means of the rivet and whose radially inner end engages teeth formed on the adjusting knob. When the adjusting knob is rotated relative to the shaft to set the force by which the friction washers are pressed against each other and thus to set the braking effect of the line spool brake mechanism, the click spring, by engaging the teeth of the adjusting knob, produces a click sound.

The click spring described above is complicated to mount, since it must be riveted on a washer.

SUMMARY OF THE INVENTION

The object of the present invention is to provide a click mechanism which is readily mounted.

According to the invention, this object is achieved by means of a click mechanism in a fishing reel, said mechanism being adapted to produce a click sound on relative rotation between a shaft having a first member non-rotatably connected thereto, and a second member rotatably mounted on the shaft, said mechanism comprising a snap-action click ring provided between said first member and said second member;

first teeth formed on the side of said first member facing said snap-action click ring; and second teeth formed on the side of said second member facing said snap-action click ring;

said snap-action click ring having a first resilient tongue and a second resilient tongue which extend in the same direction in the circumferential direction of said snap-action click ring but are outwardly bent in opposite directions in the axial direction thereof;

said first resilient tongue engaging said first teeth, and said second resilient tongue engaging said second teeth; and said first and said second teeth and said first and said second tongue being so designed that on rotation of said second member relative to said shaft in one direction, the second tongue snaps over the second teeth and produces a click sound, while said first tongue with respect to said one direction holds said snap-action click ring in non-rotatable engagement with said first teeth, and that on rotation of said second member relative to the shaft in the opposite direction, the second tongue with respect to said opposite direction holds the snap-action click ring in non-rotatable engagement with said second teeth, thereby entraining said snap-action click ring in the rotary motion of said second member, at the same time as said first tongue snaps over said first teeth and produces a click sound.

BRIEF DESCRIPTION OF THE DRAWINGS

The invention will now be described in more detail with reference to the accompanying drawings in which:

FIG. 1 is an axial longitudinal section of a line spool provided with a click mechanism according to the present invention; and FIG. 2 is an exploded view illustrating parts included in the click mechanism in more detail.

The line spool 1 shown in FIG. 1 is part of an open-face fishing reel of the fixed-spool type, of which the remaining components are not illustrated in the drawing.

The line spool 1 has a central portion 1a on which a fishing line (not shown) is to be wound, two end flanges 1b and 1c which are located on both sides of the central portion 1a and extend radially outwards therefrom, and a rearwardly directed sleeve portion 1d stiffening the rear end flange 1c. The line spool 1 preferably is formed as an integral piece and made of a relatively light material, such as aluminum or a polymer.

The line spool 1 is rotatably mounted on a hollow shaft 2 non-rotatably connected to a spindle 3 by means of a diametrically projecting pin 4 provided on the spindle and engaging in a mating recess 5 in the rear end surface of the shaft 2. The hollow shaft 2 has a through bore 6, the diameter of which is equal to the diameter of the spindle 3. In the front portion of the shaft 2, the bore 6, has a widened portion 7 defined by a forwardly facing radial abutment surface 8. The hollow shaft 2 is passed over the spindle 3 and retained thereon by resilient means 9 provided on the front end of the spindle and having two diametrically opposed rearwardly directed resilient legs engaging the abutment surface 8. A push button 10 in the form of a sleeve closed at its front end is provided in the widened portion 7. The push button 10 is axially displaceable in the widened portion 7 and on the front end of the spindle 3. When the shaft 2 and the line spool 1 mounted thereon should be removed from the spindle 3, the push button 10 is pressed inwards away from the front position shown in the drawing, such that its sleeve portion urges the legs of the resilient means 9 radially inwards. When the legs of the resilient means 9 thus have been moved out of their engagement with the abutment surface 8, the shaft 2 can be drawn off the spindle 3.

In its central portion 1a, the line spool 1 has an inner forwardly facing annular abutment surface 11 engaged by a single-acting axial ball bearing 12. The rear ball bearing race 12a, by means of which the bearing engages the abutment surface 11, is non-rotatably connected to the central portion 1a of the line spool 1, while the front ball bearing race 12b is freely rotatable relative to the shaft 2 and the line spool 1.

A spring washer 13, which is freely rotatable relative to the shaft 2 and the line spool 1, engages the front race 12b of the ball bearing. A washer 14, which is non-rotatably mounted on the shaft 2, engages the spring washer 13. The washer 14 is maintained non-rotatable on the shaft 2 by means of two diametrically opposed planar surfaces (not shown) on the shaft 2, which form a flat and cooperate with a mating, substantially rectangular hole 14a in the washer 14. The front face of the washer 14 has circumferential teeth 15 which will be described in more detail below.

An adjusting knob 16 which is screwed on the threaded front end of the shaft 2 is axially displaceable along the shaft 2 by rotation. The adjusting knob 16 has a rearwardly projecting annular lug portion 17 engaging the washer 14 radially inwardly of the teeth 15 thereof, and a rearwardly projecting annular lug portion 18 which protrudes a shorter distance than the lug portion 17 and is located radially outwardly thereof. The outer lug portion 18 is formed at its free end with circumferential teeth 19 which will be described in greater detail below. The outer lug portion 18 has a frustoconical circumferential surface 20. A substantially square snap ring 21 is mounted in an inner circumferential groove in the line spool 1. When the adjusting knob 16 is to be mounted on the shaft 2, it is screwed on the shaft, such that the conical circumferential surface 20 of the lug portion 18 urges the snap ring 21 apart, which will thereafter snap back into engagement in front of an abutment 22 on the lug portion 18. The snap ring 21 and the abutment 22 prevent unintentional unscrewing of the adjusting knob 16 from the shaft 2.

A drag washer 23 is non-rotatably connected to the line spool 1 by means of a pin 24 projecting from the rear side of the rear end flange 1c and engaging in an eccentrically positioned hole in the drag washer 23. The drag washer 23 engages the rear side of the rear end flange 1c. A further drag washer 25 is non-rotatably connected to the shaft 2 by means of splines 26 and engages a forwardly facing annular surface 27 of a stop lug 28 at the rear end of the shaft 2. A friction washer 29 is provided between the drag washers 23 and 25 in frictional engagement therewith. The friction washer 29 is loosely mounted on a coaxial sleeve 30 projecting a short distance from the rear side of the rear end flange 1c.

A radial groove 31 is formed in the rear face of the rear end flange 1c. A spool click 32 in the form of a plastic rod is inserted in the groove 31 and supported by the pin 24 extending through a hole in the radially outer portion of the spool click 32. The spool click 32 engages the splines 26 of the shaft 2 so as to produce a click sound when the line spool 1 is rotated relative to the shaft 2.

The force by which the washers 23, 25 and 29 are pressed against each other determines the braking effect exerted on the line spool 1 during its rotation relative to the shaft 2. This force is set by rotation of the adjusting knob 16, the inner lug portion 17 of which urges the washer 14 against the spring washer 13, in turn pressing the ball bearing 12 against the inner abutment surface 11 of the line spool 1. The line spool 1 presses together the washers 23, 25 and 29 between the rear end flange 1c and the stop lug 28.

A snap-action click ring 33 is provided between the washer 14 and the outer lug portion 18 of the adjusting knob 16. The snap-action click ring 33 is rotatably mounted on the inner lug portion 17 of the adjusting knob 16, said inner lug portion forming, by engaging the washer 14, a constant space for the snap-action click ring 33 between the washer 14 and the outer lug portion 18.

The snap-action click ring 33 is made from a piece of sheet-metal and has two diametrically opposite resilient tongues 34 and 35 punched therein. The resilient tongues 34 and 35 extend in the same direction in the circumferential direction of the snap-action click ring 33 but are outwardly bent in opposite directions in the axial direction thereof so as to engage the teeth 15 of the washer 14 and, respectively, the teeth 19 of the outer lug portion 18.

The teeth 15 of the washer 14 and the teeth 19 of the outer lug portion 18 consist of radial ridges of substantially rectangular cross-section (see FIG. 2).

When the adjusting knob 16 is rotated about the shaft 2 and thus relative to the washer 14 non-rotatably mounted on the shaft 2, for controlling the braking effect exerted on the line spool 1 during its rotation on the shaft 2, it produces, together with the snap-action click ring 33, a click sound.

When the adjusting knob 16 is rotated in the direction P1 for increasing the braking effect, the tongue 35 of the snap-action click ring 33 snaps over the teeth 19 and produces a click sound. The snap-action click ring 33 is not entrained in the rotation of the adjusting knob 16, since its tongue 34 by its free terminal edge engages one of the ridges of the teeth 15 of the washer 14. When the adjusting knob 16 is rotated in the direction P2 for decreasing the braking effect, the snap-action click ring 33 is however entrained since its tongue 35 by its free terminal edge engages one of the ridges of the teeth 19. Now the tongue 34 of the snap-action click ring 33 snaps over the teeth 15 of the washer 14 and produces a click sound.

It is obvious that the snap-action click ring 33 described above is extremely easy to mount.

What I claim and desire to secure by Letters Patent is:

1. A click mechanism in a fishing reel, said click mechanism being adapted to produce a click sound on relative rotation between a shaft having a first member non-rotatably connected thereto, and a second member rotatably mounted on the shaft, said mechanism comprising
   a snap-action click ring provided between said first member and said second member;
   first teeth formed on the side of said first member facing said snap-action click ring; and
   second teeth formed on the side of said second member facing the snap-action click ring;
   said snap-action click ring having a first resilient tongue and a second resilient tongue which extend in the same direction in the circumferential direction of said snap-action click ring but are outwardly bent in opposite directions in the axial direction thereof;
   said first resilient tongue engaging said first teeth, and said second resilient tongue engaging said second teeth; and
   said first and said second teeth and said first and said second tongue being so designed that on rotation of said second member relative to said shaft in one direction, the second tongue snaps over said second teeth and produces a click sound, while said first tongue with respect to said one direction holds the snap-action click ring in non-rotatable engagement with said first teeth, and that on rotation of said second member relative to the shaft in the opposite direction, said second tongue with respect to said opposite direction holds the snap-action click ring in non-rotatable engagement with said second teeth, thereby entraining the snap-action click ring in the rotary motion of said second member, at the same time as said first tongue snaps over said first teeth and produces a click sound.

2. Click mechanism as claimed in claim 1, wherein said snap-action click ring is made from a piece of sheet-metal, and that said first and said second resilient tongue are punched therein diametrically opposite one another.

3. Click mechanism as claimed in claim 1, wherein said first and said second teeth consist of radial ridges of substantially rectangular cross-section.

* * * * *